United States Patent
Murison et al.

(10) Patent No.: US 7,903,697 B2
(45) Date of Patent: Mar. 8, 2011

(54) METHOD AND SYSTEM FOR TUNABLE PULSED LASER SOURCE

(75) Inventors: Richard Murison, St. Lazare (CA); Tullio Panarello, St. Lazare (CA); Benoit Reid, Laval (CA); Reynald Boula-Picard, Montreal (CA); Stephane Caplette, Boucherville (CA)

(73) Assignee: PyroPhotonics Lasers Inc., Dollard-des-Ormeaux, Quebec (CA)

( * ) Notice: Subject to any disclaimer, the term of this patent is extended or adjusted under 35 U.S.C. 154(b) by 0 days.

(21) Appl. No.: 12/354,408

(22) Filed: Jan. 15, 2009

(65) Prior Publication Data

US 2009/0219959 A1    Sep. 3, 2009

Related U.S. Application Data

(60) Provisional application No. 61/021,453, filed on Jan. 16, 2008.

(51) Int. Cl.
 *H01S 3/30*    (2006.01)
(52) U.S. Cl. .............. 372/6; 372/26; 372/50.11; 372/99
(58) Field of Classification Search ............... 372/6, 26, 372/50.11
See application file for complete search history.

(56) References Cited

U.S. PATENT DOCUMENTS

| | | | |
|---|---|---|---|
| 5,909,297 A * | 6/1999 | Ishikawa et al. ............ | 398/198 |
| 5,933,271 A | 8/1999 | Waarts et al. | |
| 6,501,773 B1 | 12/2002 | Volz et al. | |
| 6,804,270 B1 | 10/2004 | Vakhshoori et al. | |
| 6,917,631 B2 | 7/2005 | Richardson et al. | |
| 7,256,930 B2 | 8/2007 | Liu | |
| 2002/0196816 A1 | 12/2002 | Shirasaki | |
| 2007/0009205 A1 | 1/2007 | Maleki et al. | |
| 2007/0053391 A1 * | 3/2007 | Oron et al. ................ | 372/29.01 |
| 2007/0115541 A1 | 5/2007 | Rogers et al. | |
| 2007/0268942 A1 * | 11/2007 | Murison et al. ............. | 372/25 |
| 2009/0003395 A1 | 1/2009 | Murison et al. | |

FOREIGN PATENT DOCUMENTS

| | | |
|---|---|---|
| WO | WO 2007/118326 | 10/2007 |
| WO | WO 2008/037087 | 4/2008 |

OTHER PUBLICATIONS

International Search Report and Written Opinion of PCT Application No. PCT/CA2009/000036, dated May 5, 2009, 14 pages total.

* cited by examiner

*Primary Examiner* — Dung T Nguyen
(74) *Attorney, Agent, or Firm* — Kilpatrick Townsend & Stockton LLP

(57) ABSTRACT

A tunable pulsed laser includes a seed source and an optical circulator. The optical circulator includes at least a first port coupled to the seed source, a second port, and a third port. The laser also includes an amplitude modulator characterized by a first optical side and a second optical side. The first optical side is coupled to the second port of the optical circulator. The laser further includes a first optical amplifier characterized by an input end and a reflective end. The input end is optically coupled to the second side of the amplitude modulator. The laser additionally includes a tap coupler optically coupled to the amplitude modulator and characterized by a pre-determined split ratio. Moreover, the laser includes a first photodetector optically coupled to the tap coupler and adapted to receive a portion of the seed signal transmitted through the amplitude modulator and to generate an output signal.

35 Claims, 11 Drawing Sheets

METHOD AND SYSTEM FOR TUNABLE PULSED LASER SOURCE

CROSS-REFERENCES TO RELATED APPLICATIONS

This application claims priority to U.S. Provisional Patent Application No. 61/021,453, filed on Jan. 16, 2008, and entitled "METHOD AND SYSTEM FOR TUNABLE PULSED LASER SOURCE," the disclosure of which is hereby incorporated by reference in its entirety for all purposes.

BACKGROUND OF THE INVENTION

The present invention relates generally to the field of tunable laser sources. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

Pulsed laser sources, such as Nd:YAG lasers have been used to perform laser-based material processing for applications such as marking, engraving, micro-machining, and cutting. Depending on the application and the materials to be processed, the various characteristics of the laser pulses, including pulse width, pulse repetition rate, peak power or energy, and pulse shape, are selected as appropriate to the particular application. Many existing high power pulsed lasers, for example, have pulse energy greater than 0.5 mJ per pulse) rely on techniques such as Q-switching and mode locking to generate optical pulses. However, such lasers produce optical pulses with characteristics that are predetermined by the cavity geometry, the mirror reflectivities, and the like and cannot generally be varied in the field without compromising the laser performance. Using such lasers, it is generally difficult to achieve a range of variable pulse characteristics.

Thus, there is a need in the art for pulsed laser sources with tunable pulse characteristics.

SUMMARY OF THE INVENTION

According to the present invention, techniques related generally to the field of tunable laser sources are provided. More particularly, the present invention relates to a method and apparatus for providing high power pulsed laser sources useful for industrial applications such as trimming, marking, cutting, and welding. Merely by way of example, the invention has been applied to a laser source with real-time tunable characteristics including pulse width, peak power, repetition rate, and pulse shape. However, the present invention has broader applicability and can be applied to other laser sources.

According to an embodiment of the present invention, a tunable pulsed laser source is provided. The tunable pulsed laser source includes a seed source adapted to generate a seed signal and an optical circulator. The optical circulator includes at least a first port coupled to the seed source, a second port, and a third port. The tunable pulsed laser source also includes an amplitude modulator characterized by a first optical side and a second optical side. The first optical side is coupled to the second port of the optical circulator. The tunable pulsed laser source further includes a first optical amplifier characterized by an input end and a reflective end. The input end is optically coupled to the second side of the amplitude modulator. The tunable pulsed laser source additionally includes a tap coupler optically coupled to the amplitude modulator and a first photo-detector optically coupled to the tap coupler and adapted to receive a portion of the seed signal transmitted through the amplitude modulator and to generate an output signal. The tap coupler is characterized by a pre-determined split ratio.

According to another embodiment of the present invention, a tunable pulsed laser source is provided. The tunable pulsed laser source includes a seed source adapted to generate a seed signal and an optical circulator. The optical circulator includes at least a first port coupled to the seed source, a second port, and a third port. The tunable pulsed laser source also includes an amplitude modulator characterized by a first optical side and a second optical side. The first optical side is coupled to the second port of the optical circulator. The tunable pulsed laser source further includes a first optical amplifier characterized by an input end and a reflective end. The input end is coupled to the second side of the amplitude modulator. The tunable pulsed laser source additionally includes a second optical amplifier coupled to the third port of the optical circulator and a gain clamping source optically coupled to the second optical amplifier.

According to yet another embodiment of the present invention, a tunable pulsed laser source is provided. The tunable pulsed laser source includes a seed source adapted to generate a seed signal and an optical circulator including at least a first port coupled to the seed source, a second port, and a third port. The tunable pulsed laser source also includes an amplitude modulator adapted to receive a DC electrical signal from a digital-to-analog converter and a Radio Frequency (RF) electrical signal from a digital arbitrary waveform generator. The amplitude modulator has a first optical side and a second optical side. The first optical side is coupled to the second port of the optical circulator. The tunable pulsed laser source further includes a first optical amplifier having an input end and a reflective end. The input end is coupled to the second optical side of the amplitude modulator. The tunable pulsed laser source additionally includes a tap coupler optically coupled to the amplitude modulator. The tap coupler is characterized by a pre-determined split ratio. Moreover, the tunable pulsed laser source includes a photo-detector optically coupled to the tap coupler and adapted to receive a portion of the seed signal transmitted through the amplitude modulator defined by the pre-determined split ratio, a second optical amplifier coupled to the third port of the optical circulator, an optical isolator optically coupled to the second optical amplifier, a third optical amplifier coupled to the optical isolator, and a gain clamping source optically coupled to the optical circulator.

According to an alternative embodiment of the present invention, a method of providing a series of laser pulses is provided. The method includes providing a seed signal at a first port of an optical circulator, transmitting the seed signal through an amplitude modulator coupled to a second port of the optical circulator, and detecting a portion of the seed signal transmitted through the amplitude modulator using a first photo-detector. The method also includes generating a DC electrical bias as a function of the detected portion, applying the DC electrical bias to the amplitude modulator, and reducing an amount of the seed signal transmitted through the amplitude modulator. The method further includes applying a first shaped RF electrical drive signal to the amplitude modulator to generate a shaped optical pulse, amplifying the shaped optical pulse in a first optical amplifier to provide an amplified shaped optical pulse, applying a second shaped RF electrical drive signal to the amplitude modulator to reshape the amplified shaped optical pulse, and amplifying the reshaped optical pulse in a second optical amplifier to provide an amplified reshaped optical pulse.

According to another alternative embodiment of the present invention, a method of providing a series of laser pulses is provided. The method includes providing a seed signal at a first port of an optical circulator, transmitting the seed signal through an amplitude modulator coupled to a second port of the optical circulator, and applying a first shaped RF electrical drive signal to the amplitude modulator to generate a shaped optical pulse. The method also includes amplifying the shaped optical pulse in a first optical amplifier to provide an amplified shaped optical pulse, applying a second shaped RF electrical drive signal to the amplitude modulator to reshape the amplified shaped optical pulse, and providing an optical gain clamping signal. The method further includes injecting the optical gain clamping signal into a second optical amplifier optically coupled to a third port of the optical circulator, and amplifying the reshaped optical pulse using the second optical amplifier to provide an amplified reshaped optical pulse.

According to a specific embodiment of the present invention, a tunable pulsed laser source is provided. The tunable pulsed laser source includes a seed source (e.g., a semiconductor laser such as an FBG-stabilized semiconductor laser) adapted to generate a seed signal and an optical circulator. The optical circulator includes at least a first port coupled to the seed source, a second port, and a third port. The tunable pulsed laser source also includes an amplitude modulator (e.g., a Mach-Zehnder interferometric amplitude modulator adapted to perform time-domain transmission filtering of the seed signal) adapted to receive a DC electrical signal from a digital-to-analog converter and a RF electrical signal from a digital arbitrary waveform generator. The amplitude modulator is further characterized by a first optical side and a second optical side. The first optical side is coupled to the second port of the optical circulator.

The tunable pulsed laser source further includes a double-pass optical amplifier characterized by an input end and a reflective end. The input end is coupled to the second side of the amplitude modulator. The tunable pulsed laser source additionally includes a tap coupler optically coupled to the double-pass optical amplifier, a photo-detector optically coupled to the tap coupler and adapted to receive a portion of the seed signal transmitted through the amplitude modulator with a pre-determined split ratio (e.g., less than 10%, less than 5%, or between 0.5% and 2%), an optical pre-amplifier coupled to the third port of the optical circulator, and a gain clamping source (e.g., a semiconductor laser such as an FBG-stabilized semiconductor laser) adapted to generate a gain clamping signal optically coupled into the optical pre-amplifier. The optical pre-amplifier may be a pump laser optically coupled to a rare-earth doped optical fiber (e.g., an Ytterbium-doped optical fiber that may be polarization maintaining).

In a particular embodiment, the optical circulator further includes a fourth port optically coupled to a photo-detector and adapted to monitor backward travelling light signal from the optical pre-amplifier. The seed source may have a wavelength between 1040 nm and 1100 nm, for example, between 1060 nm and 1070 nm. The gain clamping source may have a wavelength between 980 nm and 1060 nm, for example a wavelength between 1020 nm and 1050 nm or a wavelength between 1025 nm and 1035 nm. The amplitude modulator may be adapted to receive the DC electrical signal and the RF electrical signal into a single electrical port or may be adapted to receive the DC electrical signal into a first electrical port and the RF electrical signal into a second electrical port.

The double-pass optical amplifier may include a pump laser that is optically coupled to a rare-earth doped optical fiber (e.g., an Ytterbium-doped optical fiber), which may be polarization maintaining. The double-pass optical amplifier may further include an optical out-of-band loss element (e.g., a 1032 nm and 1064 nm wavelength-division multiplexing fiber component or a 976 nm and 1064 nm wavelength-division multiplexing fiber component), which may have a transmission loss less than 3 dB at an operating wavelength and induce an optical loss greater than 10 dB at out-of-band wavelengths. In a particular application, the out-of-band loss element has a transmission loss less than 3 dB at around 1064 nm and induces an optical loss greater than 10 dB at around 1032 nm.

In another particular embodiment, the tunable pulsed laser source further includes an optical power amplifier, which may include a pump laser optically coupled to a rare-earth doped optical fiber, such as a polarization maintaining Ytterbium-doped optical fiber. The rare-earth doped optical fiber may have a multimode core, which may be adapted to amplify substantially the fundamental mode over the higher order modes. In a particular application, the fundamental mode amplification is greater than 15 dB over the higher-order modes amplification. Merely by way of example, the optical power in the fundamental mode may be greater than the optical power in the higher-order modes by at least 15 dB at the output of the rare-earth doped optical fiber. Additionally, the fundamental mode amplification may be greater than 20 dB over the higher-order modes amplification. Moreover, the optical power in the fundamental mode may be greater than the optical power in the higher-order modes by at least 20 dB at the output of the rare-earth doped optical fiber. The optical power amplifier may be adapted to receive a portion of the gain clamping signal or a portion of the gain clamping signal amplified through the pre-amplifier. The tunable pulsed laser source may additionally include an optical isolator between the pre-amplifier and the power amplifier.

According to another specific embodiment of the present invention, a method of providing a series of laser pulses is provided. The method includes providing a seed signal at a first port of an optical circulator, transmitting the seed signal through an amplitude modulator coupled to a second port of the optical circulator, and detecting a portion of the seed signal transmitted through the amplitude modulator. The method also includes applying a DC electrical bias to the amplitude modulator such as to minimize the electrical signal generated by the photo-detector, applying a first shaped RF electrical drive signal to the amplitude modulator to generate a shaped optical pulse, and amplifying the shaped optical pulse into a double-pass optical amplifier to provide an amplified shaped optical pulse. The method further includes applying a second shaped RF electrical drive signal to the amplitude modulator to reshaped the amplified shaped optical pulse, injecting an optical gain clamping signal into an optical pre-amplifier coupled to a third port of the optical circulator, and amplifying the reshaped optical pulse using the optical pre-amplifier to provide an amplified reshaped optical pulse. In a particular embodiment, detecting a portion of the seed signal may include using a photodetector optically coupled to an optical coupler, for example, a tap coupler.

According to yet another specific embodiment of the present invention, a tunable pulsed laser source is provided. The tunable pulsed laser source includes a seed source adapted to generate a seed signal and an optical circulator. The optical circulator includes a first port coupled to the seed source, a second port, and a third port. The tunable pulsed laser source also includes an amplitude modulator characterized by a first side and a second side maintained under appropriate voltage bias and adapted to track modulator bias drifts. The first side is coupled to the second port of the optical circulator. The tunable pulsed laser source further includes a double-pass optical amplifier characterized by an input end and a reflective end including a spectral-domain reflectance filter. The double-pass amplifier can further include a out-of-band loss element. The input end is coupled to the second side of the amplitude modulator. Moreover, the tunable pulsed laser source includes an optical pre-amplifier coupled to the third port of the optical circulator and a gain-clamping source.

Numerous benefits are achieved using the present invention over conventional techniques. For example, in an embodiment according to the present invention, high power, pulsed lasers suitable for laser processing are provided that utilize a compact architecture that is inexpensive in comparison to lasers with comparable performance characteristics. Moreover, in embodiments of the present invention, short pulses are generated with pulse characteristics that are tunable in real-time while maintaining pulse-to-pulse stability. Furthermore, in an embodiment according to the present invention, optical pulses can be shaped to optimize the pulse profile for the particular application, or to maximize energy extraction efficiency in the laser system. In a particular embodiment according to the present invention, drifting of transmitted light signals can be reduced by including a tap coupler and a photo-detector to detect a portion of transmitted signals through an amplitude modulator and applying a DC bias to the amplitude modulator. The DC bias depends on an output signal from the photo-detector. Moreover, a gain outside an operating wavelength can be reduced by including a gain clamping source. The gain clamping source has a different wavelength from an operating wavelength of a seed source. Furthermore, in embodiments of the present invention, the laser source has a backward monitoring function by including a photo-detector to detect ASE backward signals from an optical pre-amplifier. A pump power into the pre-amplifier can be reduced based upon the detected ASE backward signals. In addition, an out-of-band loss element may be included in the double-pass optical amplifier to reduce loss at an operating wavelength and increase loss at out-of-band wavelengths. Depending upon the embodiment, one or more of these benefits may exist. These and other benefits have been described throughout the present specification and more particularly below. Various additional objects, features and advantages of the present invention can be more fully appreciated with reference to the detailed description and accompanying drawings that follow.

DETAILED DESCRIPTION OF SPECIFIC EMBODIMENTS

Figure 1:
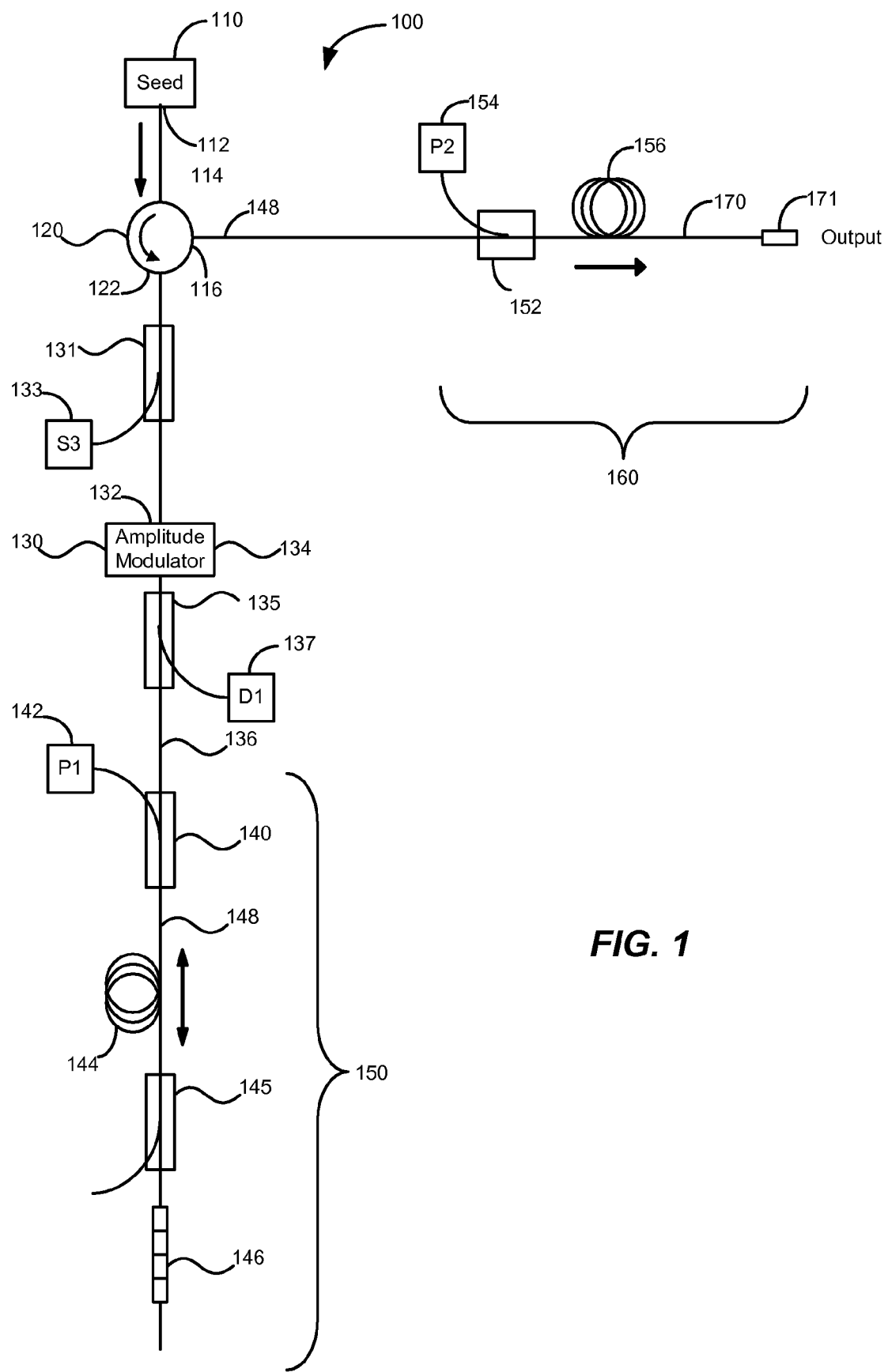
FIG. 1 is a simplified schematic illustration of a high power pulsed laser with tunable pulse characteristics using optical fiber amplifiers according to an embodiment of the present invention.

FIG. 1 is a simplified schematic illustration of a high power pulsed laser with tunable pulse characteristics using optical fiber amplifiers according to an embodiment of the present invention. High power pulsed laser 100 includes a seed source 110 that generates a seed signal that is injected into a first port 114 of an optical circulator 120. Circulators are well known in the art and are available from several suppliers, for example, model OC-3-1064-PM from OFR, Inc. of Caldwell, N.J. According to an embodiment of the present invention, the optical seed signal is generated by using a seed source 110 that is a continuous wave (CW) semiconductor laser. In a particular embodiment, the CW semiconductor laser is a fiber Bragg grating (FBG) stabilized semiconductor diode laser operating at a wavelength of 1064 nm with an output power of 150 mW. In other embodiments, the seed source 110 operates at a wavelength around 1550 nm. The power can be lower or greater than 150 mW. For example, the output power can be 50 mW, 200 mW, 250 mW, or the like. In another particular embodiment, the semiconductor seed laser can be pulsed to achieve higher peak optical power. For example, the peak power can be 250 mW, 500 mW, 750 mW, 1 W, 2 W, or the like. The pulse width can be determined for the application at hand to minimize heating in the semiconductor seed laser. For example, the pulse width can be 500 ns, 1 μs, 2 μs. The pulse width can be shorter than 500 ns or longer than 2 μs. In alternative embodiments, the seed signal is generated by a compact solid-state laser or a fiber laser. One of ordinary skill in the art would recognize many variations, modifications, and alternatives.

After passing through the optical circulator 120, the seed signal exits from a second port 122 of the circulator 120 propagates through a gain clamping signal coupler 131 and impinges on a first side 132 of an optical amplitude modulator 130.

According to embodiments of the present invention, optical amplitude modulator provides amplitude modulation and time-domain filtering of the seed signal as well as amplified spontaneous emission (ASE) filtering. In a particular embodiment, the length of the optical pulse is determined by the operation of the optical amplitude modulator 130, which may be an APE-type Lithium Niobate Mach-Zehnder modulator having a bandwidth >3 GHz at 1064 nm.

According to embodiments of the present invention, the optical amplitude modulator 130 is an electro-optic Mach-Zehnder type modulator, which provides the bandwidth necessary for generating short optical pulses. In other embodiments, the optical amplitude modulator 130 is a phase or frequency modulator with a suitable phase or frequency to amplitude converter, such as an edge optical filter, an extinction modulator, or an acousto-optic modulator.

Figure 2:
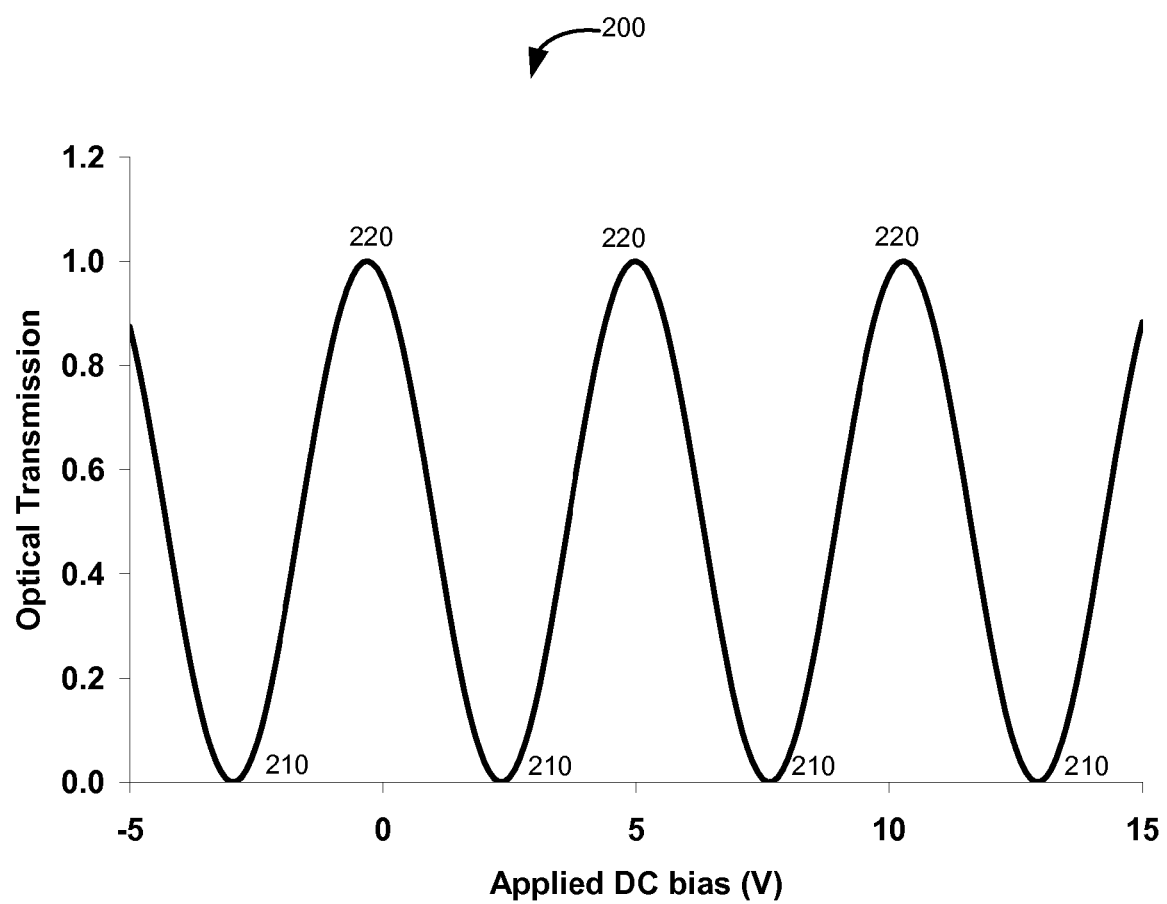
FIG. 2 is a simplified illustration of the transmission characteristic of a Mach-Zehnder modulator as a function of applied bias voltage.

The optical amplitude modulator 130 is normally held in an "off" state, in which the seed signal transmitted through the modulator is very low. The amount of seed light transmitted through the modulator depends on a DC voltage bias applied to the modulator. For a Mach-Zehnder type modulator, the transmission loss depends almost periodically with the applied DC voltage bias. FIG. 2 is a simplified curve 200 illustrating light transmission through a Mach-Zehnder modulator as a function of bias voltage. FIG. 2 shows that there exist multiple bias voltages 210, where light transmission is a minimum. Also at bias voltages 220, light transmission is a maximum. The ratio between the maximum and minimum values is defined as the extinction ratio (ER). Typically the extinction ratio can be 20 dB or higher. In an embodiment, the extinction ratio is larger than 30 dB. The smallest voltage difference between two successive minima or maxima is defined as $2 \times V_\pi$. Typically $V_\pi$ is between 2 and 5 volts. Therefore the DC voltage bias would also have a value less than 10 volts.

In a Lithium Niobate Mach-Zehnder modulator, the light transmission characteristic curve 200 drifts with time, temperature and light intensity. This drift is usually attributed to the photo-refractive properties of the Lithium Niobate material. In a photo-refractive material, light creates electrical charges opposing any externally applied voltages or field. Therefore, in a Mach-Zehnder modulator made with Lithium Niobate, the photo-refractive effect tends to oppose the applied DC voltage bias and leads to a drift in the transmission characteristics. Typically this shift can be regarded as a whole translation of the transmission characteristic curve 200 toward higher voltages, without significant modifications of $V_\pi$. For some modulators, the shift occurs toward lower voltages. For example, in a particular modulator, the $V_\pi$ can have a value of 3.2 volts and a minimum transmission can occur at a voltage of 0.5 volts. This minimum transmission point can shift from 0.5 volts to 5.4 volts in minutes, hours, or days under light. If the DC voltage bias is maintained at 0.5 volts, the light transmission (light power) would be increasing from a minimum to a higher value. The rate of shift depends on the modulator fabrication method, light intensity, and the like.

In a particular embodiment of the present invention, the shift of the transmission characteristics of the modulator is tracked in order to maintain the transmitted seed signal power at a pre-determined level. This is achieved by applying the same drift on the DC voltage bias as the transmission characteristic drift. In the previous example, in order to maintain the transmitted seed signal power to a minimum level, the DC voltage bias would have to evolve from a value of 0.5 volts to 5.4 volts at the same time as the modulator characteristics drift.

Figure 9:
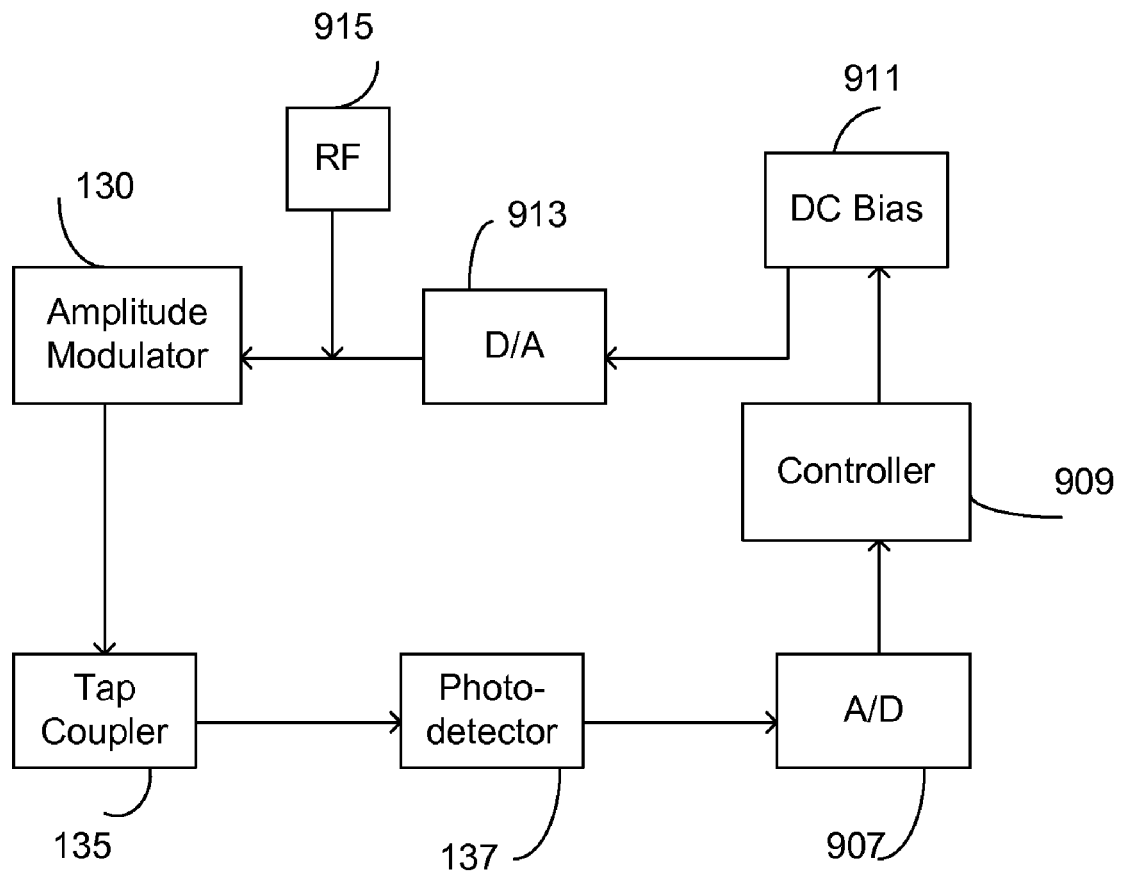
FIG. 9 is a simplified diagram illustrating a subset of components of FIG. 1 with a controller for minimizing the drifting of light transmission.

Returning now to FIG. 1, the seed signal transmitted through the modulator 130 propagates through an optical coupler 135 (e.g., a tap coupler), where a fraction of the incident light is split to optical photo-detector 137. The split ratio can have a value of around 1%. In some embodiments the split ratio can be less than 1% or higher than 1%. In a preferred embodiment of the present invention, the optical signal impinging on the photo-detector 137 or equivalently, the electrical signal generated by the photo-detector is maintained at a minimum value by applying the proper DC voltage bias on the amplitude modulator 130. In some embodiments, this proper DC voltage bias is obtained by using an electrical analog control loop that would oscillate towards the DC voltage bias providing the lowest signal on the photo-detector 137. In other embodiments, as shown in FIG. 9, the photo-detector 137 is electrically coupled to an analog-to-digital (A/D) converter 907. A controller 909 is adapted to receive a signal from the A/D converter 907 and to adjust the DC voltage based on the signal. Then, the DC voltage bias is applied to the amplitude modulator 130 after conversion by a digital-to-analog converter 913. An RF signal source 915 may be electrically coupled to the amplitude modulator 130 through the same port as the DC bias. The RF signal source 915 may also be electrically coupled to the amplitude modulator 130 through another port (not shown). By using a processing unit, such as a computer or micro-controller, connected to both converters, the present inventors have designed an algorithm that minimizes the digital signal coming from the photo-detector 137. In essence, the algorithm is very similar to a numerical minimization problem. Typically, the response time of an analog or digital control loop can be faster than a few seconds, which permits a proper tracking and compensation of the drift of the modulator.

Figure 6:
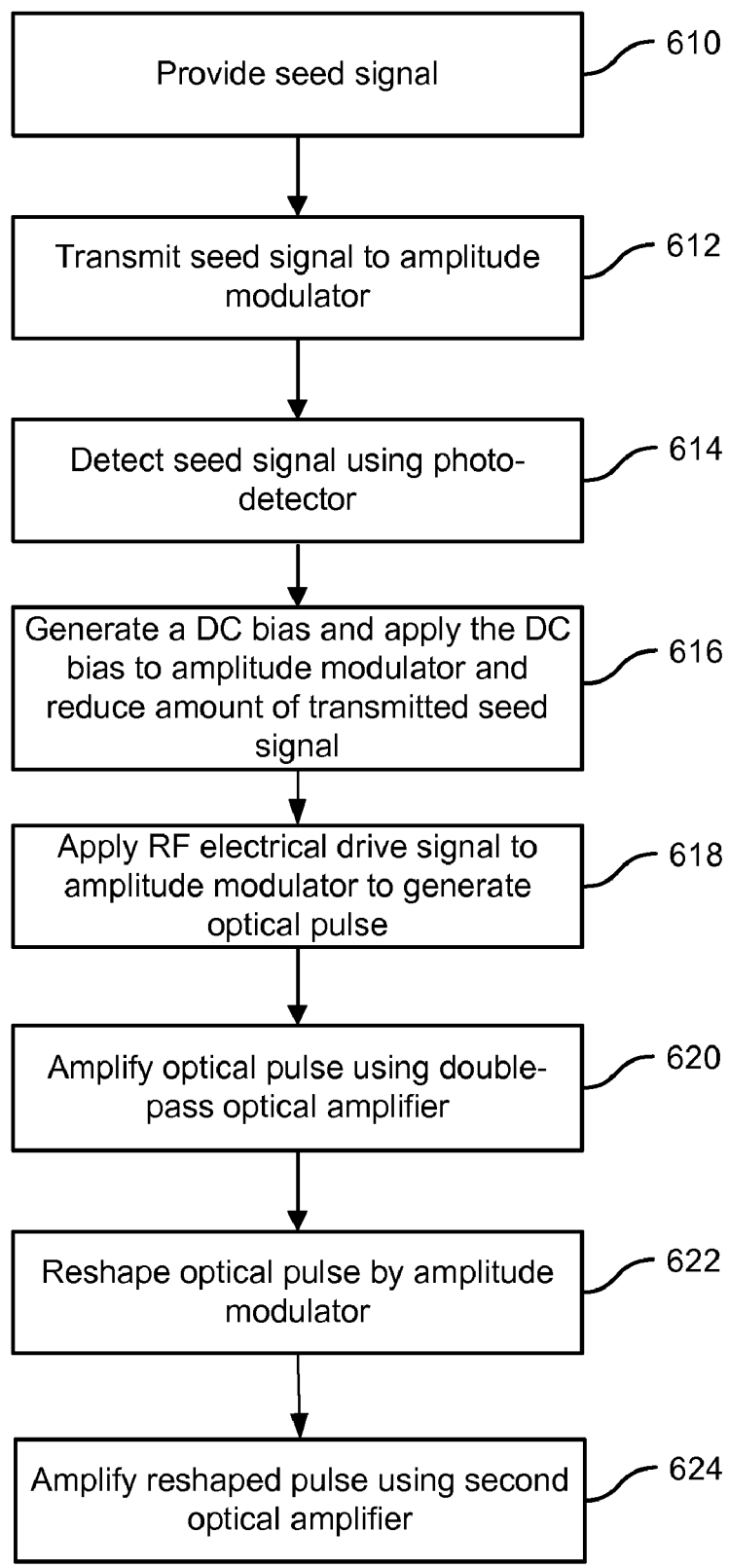
FIG. 6 is a flow chart illustrating steps for applying a DC bias to an amplitude modulator by using a photo-detector to provide a feedback signal to minimize a drift of light transmission.

It should be appreciated that the specific steps illustrated in FIG. 6 provide a particular method for providing a tap coupler 135 and a photo-detector 137 to minimize the drift of a transmitted seed signal according to an embodiment of the present invention. The method starts with providing seed signal at step 610 and transmitting the seed signal to an amplitude modulator 130 at step 620. The method also includes detecting a portion of the seed signal by using photo-detector 137 at step 614. The method further includes generating a DC bias as a function of the detected portion of the seed signal and applying the DC bias to the amplitude modulator 130 to reduce an amount of the transmitted seed signal through the amplitude modulator at block 616. The amount of the transmitted seed signal may be minimized in some embodiments. Moreover, the method includes applying an RF electrical drive signal to the amplitude modulator to generate optical pulses at block 618, and then amplifying the optical pulses using double-pass optical amplifier 150 at step 620. Furthermore, at step 622, the method includes reshaping the optical pulses by the amplitude modulator, when the optical pulses are reflected by a reflecting component 146 to pass through the double-pass optical amplifier 160 to be gated by the amplitude modulator 130. At block 624, the reshaped optical pulses are amplified using optical pre-amplifier 160.

In order to pass the seed signal, the optical amplitude modulator 130 is pulsed to the "on" state for a first time to generate an optical pulse along optical path 136. The pulse width and pulse shape of the optical pulse generated by the optical amplitude modulator 130 are controlled via by the modulator drive signal, or RF electrical signal applied to the optical amplitude modulator 130. In some modulators, the RF electrical signal is applied to the modulator through a first electrical port, while the DC voltage bias is applied through a second electrical port. In other modulators, the RF electrical signal is applied through the same port as the DC voltage bias. In this configuration, it is usually preferable to use a bias T to mix the RF signal and the DC voltage bias together prior to their injection into the single electrical port. The optical pulse then passes for a first time through a double-pass optical amplifier 150, where it is amplified. According to embodiments of the present invention, the amplitude modulator, driven by a time varying drive signal, provides time-domain filtering of the seed signal, thereby generating a laser pulse with predetermined pulse characteristics, including pulse width, pulse shape, and pulse repetition rate.

According to some embodiments of the present invention the RF electrical drive signal applied to the optical amplitude modulator 130 has a shaped waveform originating from a digital arbitrary waveform generator. Using a computer, a micro-controller, or other processing unit(s), shaped waveforms are generated by creating a digital representation of the waveform in the memory on-board of a high speed Digital-to-Analog Converter (DAC). This digital pattern is then converted into an analog signal using a high speed Digital-to-Analog Converter (DAC). Preferably the DAC's output rise and fall times are less than 1 ns, more preferably less than 500 picoseconds (ps), most preferably less than 300 ps. Preferably the DAC is configured to generate a pre-programmed waveform loaded into memory using a computer every time a trigger event occurs. Preferably the sampling rate of the DAC is at least 500 megasample/s (MS/s), more preferably it is at least 1 gigasample/second (GS/s), most preferably it is at least 2 GS/s. With such a sampling rate, the digital pattern can be defined every 2 nanosecond (ns) or better. With 1 GS/s sampling rate, this means that arbitrary waveform can be generated with 1 ns resolution. Preferably the DAC has an analog electrical bandwidth larger than 100 MHz, more preferably the analog bandwidth is larger than 300 MHz, and most preferably it is larger than 1 GHz. Preferably the voltage resolution of the DAC is 8 bits, more preferably it is 10 bits, most preferably it is 12 bits or better.

According to an embodiment of the present invention, the double-pass optical amplifier 150 is an optical fiber amplifier. Fiber amplifiers utilized in embodiments of the present invention include, but are not limited to, rare-earth-doped single-clad, double-clad, or even multiple-clad optical fibers. The rare-earth dopants used in such fiber amplifiers include Ytterbium, Erbium, Holmium, Praseodymium, Thulium, or Neodymium. In a particular embodiment, all of the fiber-optic based components utilized in constructing double-pass optical amplifier 150 utilize polarization-maintaining single-mode fiber.

Referring once again to FIG. 1, in embodiments utilizing fiber amplifiers, a pump 142 is coupled to a rare-earth-doped fiber loop 144 through optical coupler 140. Generally, a semiconductor pump laser is used as pump 142. One of ordinary skill in the art would recognize many variations, modifications, and alternatives. In alternative embodiments, the double-pass optical amplifier 150 is a solid-state amplifier including, but not limited to, a solid-state rod amplifier, a solid-state disk amplifier or gaseous gain media.

In a particular embodiment, the double-pass optical amplifier 150 includes a 5 meter length of rare-earth doped fiber 144, having a core diameter of approximately 4.1 µm, and doped with Ytterbium to a doping density of approximately $4 \times 10^{24}$ ions/m³. The amplifier 150 also includes a pump 142, which is an FBG-stabilized semiconductor laser diode operating at a wavelength of 976 nm, and having an output power of 100 mW. In another particular embodiment, the pump 142 is a semiconductor laser diode operating at a wavelength of about 915 nm. In yet another particular embodiment, the pump 142 is a semiconductor laser diode operating at an output power of 450 mW or more. In a specific embodiment, the amplifier 150 also includes a pump to fiber coupler 140, which is a wavelength division multiplexer (WDM) pump combiner.

The signal emerging from double-pass optical amplifier 150 along optical path 148 then impinges on a reflecting structure 146, and is reflected back into double-pass optical amplifier 150. The signal passes for a second time through double-pass optical amplifier 150, wherein the signal is amplified. The reflecting structure 146 performs spectral domain filtering of the laser pulse and of the amplified spontaneous emission (ASE) propagating past optical path 148. Thus, the seed signal experiences both amplitude and time-domain modulation passing through amplitude modulator 130, and spectral-domain filtering upon reflection from reflecting structure 146.

In an embodiment, the reflecting structure 146 is a fiber Bragg grating (FBG) that is written directly in the fiber used as the double-pass optical amplifier 150. The periodicity and grating characteristics of the FBG are selected to provide desired reflectance coefficients as is well known in the art. Merely by way of example in a particular embodiment, the reflecting structure 146 is a FBG having a peak reflectance greater than 90%, and a center wavelength and spectral width closely matched to the output of the seed source 110. In some embodiments, the center wavelength of the FBG closely matches the wavelength of the seed source 110, but has a significantly broader bandwidth. For example, the FBG can have a central wavelength around 1064 nm and a bandwidth of about 3 nm, or 5 nm.

The double-pass optical amplifier 150 can further comprise an out-of-band loss element 145. This component is used to minimize lasing instabilities in the double-pass amplifier 150, which can occur due to high optical gain at out-of-band wavelength, outside the seed source wavelength. The out-of-band loss element 145 increases the optical loss at out-of-band wavelengths more susceptible to lasing instabilities, while minimizing extra optical loss at the operating wavelength. Preferably the increase in out-of-band loss is higher than 10 dB and the extra optical loss at the operating wavelength is less than 3 dB. A lasing instability can occur in the double-pass amplifier if the return loss from the optical components is equal or higher than the double-pass gain of the amplifier. For some amplifier designs, the gain at out-of-band wavelengths can be higher than the gain at the operating wavelength and lasing could occur first at out-of-band wavelengths. For example, in a double-pass fiber amplifier doped with Ytterbium, it is possible to achieve gain higher than 30 dB at a wavelength of around 1064 nm. However, the gain at around 1030 nm could then be higher than 45 dB, which creates the potential for instabilities. An out-of-band loss element 145 is introduced to increase the optical loss at 1030 nm, while minimizing extra optical loss at 1064 nm. Such an out-of-band loss element could be a wavelength division multiplexer (WDM). For example, it can be a 1030 nm and 1064 nm WDM, or a 976 nm and 1064 nm WDM. Preferably the increase in optical loss at around 1030 nm would be higher than 10 dB, while the extra loss at 1064 nm would be less than 3 dB.

The signal emerging from double-pass optical amplifier 150 along optical path 136 impinges on the second side 134 of the optical amplitude modulator 130, which is then pulsed to the "on" state a second time to allow the incident pulse to pass through. According to embodiments of the present invention, the timing of the second "on" pulse of the optical amplitude modulator 130 is synchronized with the first opening of the modulator 130 (first "on" pulse) to take account of the transit time of the signal through the amplifier 150 and the reflecting structure 146. After emerging from the first side of the optical amplitude modulator 130, the amplified pulse then enters the second port 122 of optical circulator 120, and exits from the third port 116 of optical circulator 120 along optical path 148.

The signal is then amplified as it passes through an optical pre-amplifier 160. As discussed in relation to FIG. 1, embodiments of the present invention utilize a fiber amplifier as optical amplifier 160, including a pump 154 that is coupled to a rare-earth-doped fiber loop 156 through an optical coupler 152. Generally, a semiconductor pump laser is used as pump 154, although pumping of optical amplifiers can be achieved by other means as will be evident to one of skill in the art. In a particular embodiment, the optical pre-amplifier 160 includes a 3 meter length of rare-earth doped fiber 156, having a core diameter of approximately 4.8 µm, and is doped with Ytterbium to a doping density of approximately $6 \times 10^{24}$ ions/m$^3$. The amplifier 160 also includes a pump 154, which is an FBG-stabilized semiconductor laser diode operating at a wavelength of 976 nm, and having an output power of 500 mW. In another particular embodiment, the optical pre-amplifier 160 includes a 3 meter length of rare-earth doped fiber 156, having a core diameter of approximately 10 µm, doped with Ytterbium to a doping density of approximately $1 \times 10^{26}$ ions/m$^3$. The amplifier 160 can also include a pump 154, which is a multimode semiconductor laser diode having an output power of 5 W. Preferably then, the optical fiber would include a double-clad fiber or multi-clad fiber as is well known in the art. The pump output power can be higher or lower than 5 W. For example, it can be 3 W, 4 W, 6 W, or more. The optical pre-amplifier 160 can amplify optical pulses to 30 µJ, 50 µJ, or even higher 100 µJ of energy per pulse.

The optical pre-amplifier 160 can further comprise a protective device 171 to maintain the integrity of the optical fiber and air interface. Under high optical peak power or high energy per pulse, for example 10 kW of peak power or 100 µJ of energy per pulse, the fiber to air interface can be damaged. In fact, optical damage is due to fluence or intensity and not strictly speaking to energy or power. The protective device 171, also called optical end cap is used to let the optical beam inside the fiber expand to reach a lower intensity or fluence before the air interface. The end cap can be a piece of larger core fiber or glass rod fused to the end of the optical fiber. For example, a piece of 100 µm core or larger fiber can be fused or spliced to the end of a 10 µm core fiber such that the optical beam expands from approximately 10 µm to about 100 µm, therefore reducing the intensity by a factor of 100.

In many rare-earth-doped optical fibers, the gain spectrum is broad, and can have a width, for example, of more than 50 nm. Often, an optical fiber amplifier constructed with such an optical fiber can be operated at wavelength away from the gain peak depending on the application at hand. For example, in Ytterbium-doped optical fiber, the optical peak gain, when pumped at around 976 nm, can be located at around 1032 nm. In many applications, it is advantageous to operate the fiber amplifier at a wavelength of 1064 nm, where the gain could be lower. One potential disadvantage of operating at a wavelength away from the gain peak can be instabilities or spurious lasing at the gain peak wavelength. This is caused by the high gain outside the operating wavelength.

For example, in Ytterbium-doped fiber, the fiber amplifier designer can require a gain of 30 dB at 1064 nm, which could lead to a gain of more than 45 dB at around 1032 nm. This high gain at 1032 nm could lead to spurious lasing at this wavelength impacting negatively the operation at 1064 nm. It would be very advantageous to minimize the gain outside the operating wavelength to prevent any problems.

Figure 11:
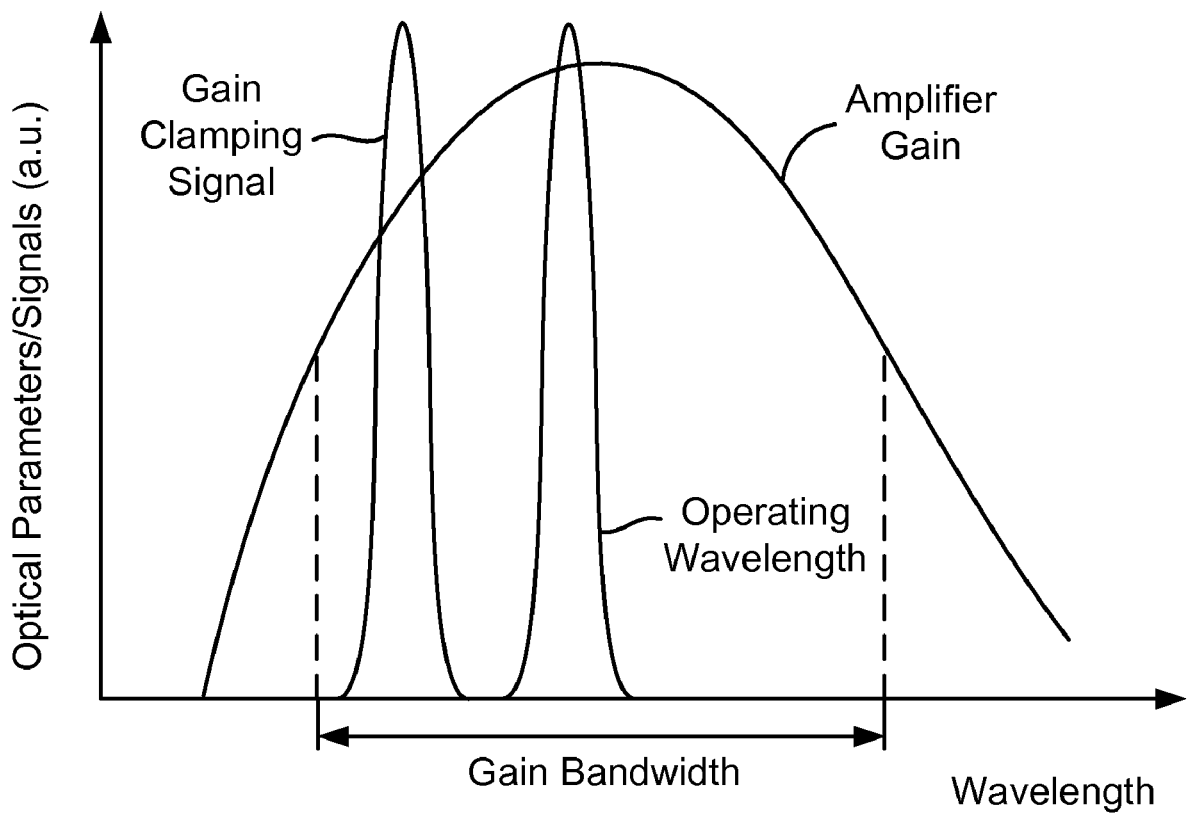
FIG. 11 is a simplified spectral diagram illustrating wavelengths associated with a gain clamping source, a seed source, and an optical amplifier.

In a specific embodiment of the present invention, the tunable pulse laser includes a gain-clamping device to minimize out-of-band gain away from the operating wavelength. Returning once more to FIG. 1, the invention includes a gain clamping signal source (S3) 133 injected into the tunable laser using a gain clamping signal coupler 131. The gain clamping signal source S3 has preferably a wavelength close to the pre-amplifier gain peak and different from the operating wavelength, as shown in FIG. 11. The role of the gain clamping signal is to extract most of the optical gain at the gain clamping signal wavelength, hence preventing instabilities or spurious lasing. Moreover, the gain clamping signal tends to decrease the amount of ASE propagating backward from the optical pre-amplifier 160 towards the optical circulator 120, therefore decreasing the potential for optical damage to the optical circulator. For example, when the optical pre-amplifier is pumped with 6 W of optical pump power, the amount of ASE propagating backward, without the presence of the gain clamping signal could be as high as 2-3 W, which could damage the optical circulator.

Figure 8:
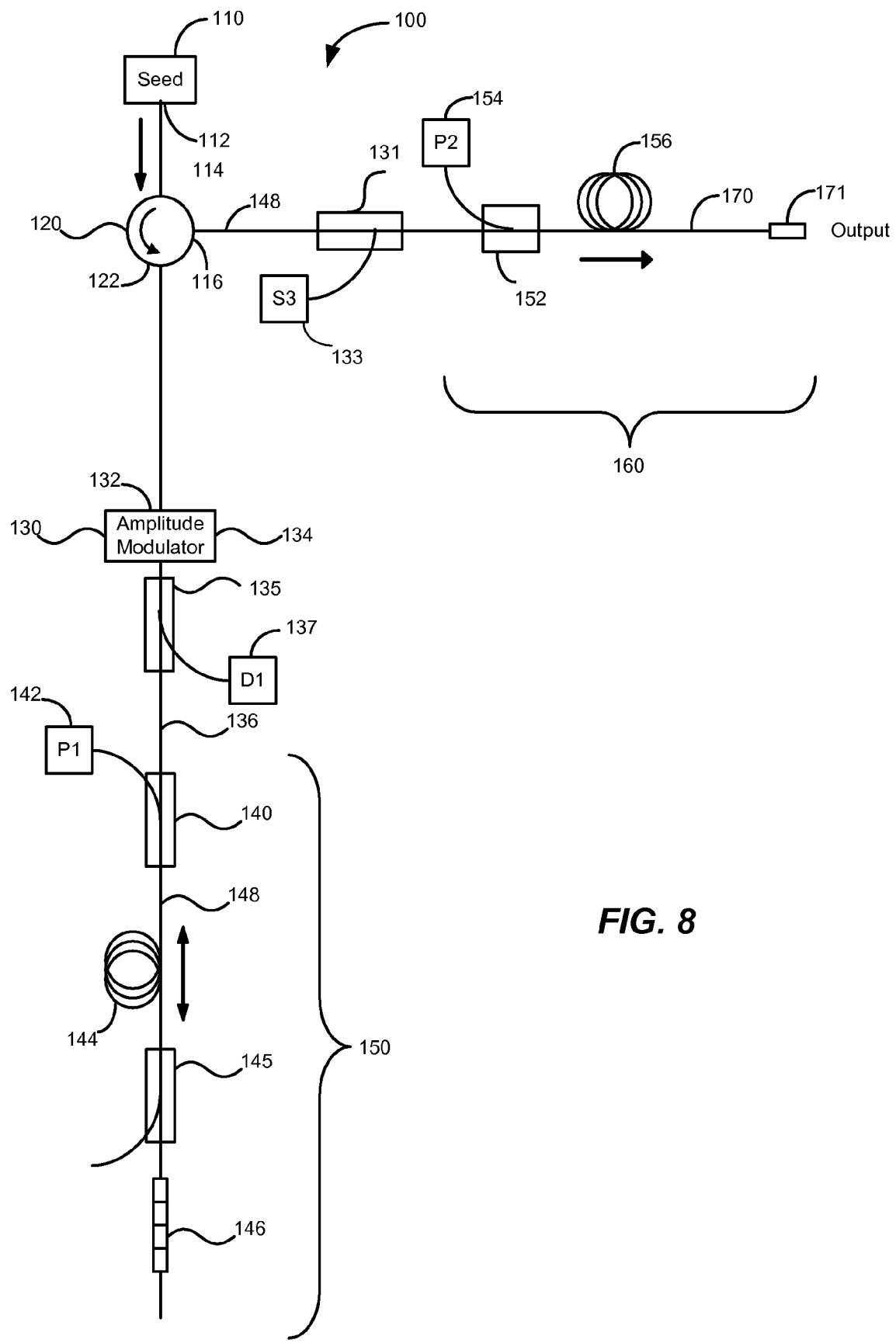
FIG. 8 is an alternative schematic illustration of a high power pulsed laser with tunable pulse characteristics using optical fiber amplifiers according to another embodiment of the present invention.

With the presence of the gain clamping signal, the backward travelling ASE can be reduced to 10-50 mW, which is usually low enough not to damage optical components. The gain clamping signal coupler 131 is preferably inserted between the second port 122 of the optical circulator 120 and the amplitude modulator 130 to prevent lasing instabilities in the optical pre-amplifier 160. It will be appreciated that it is possible to insert the gain clamping signal coupler 131 at other positions. For example, the gain clamping signal coupler can be inserted between the third port 116 of circulator 120 and the optical coupler 152, as shown in FIG. 8. The present inventors have discovered that in the latter configuration, when the return loss from the gain clamping signal coupler is not high enough, spurious lasing can occur in the optical pre-amplifier 160. This is the reason why the gain clamping signal coupler is preferably inserted between the circulator 120 and the amplitude modulator 130. However, this should not be considered as a limitation to the present invention since gain clamping signal couplers from different vendors can have a return loss high enough to prevent spurious lasing. The gain clamping signal is injected along with the optical signal returning from the modulator into port 2 of the circulator 120 and both exit from port 3 of the circulator and are injected into the optical pre-amplifier 160.

Figure 7:
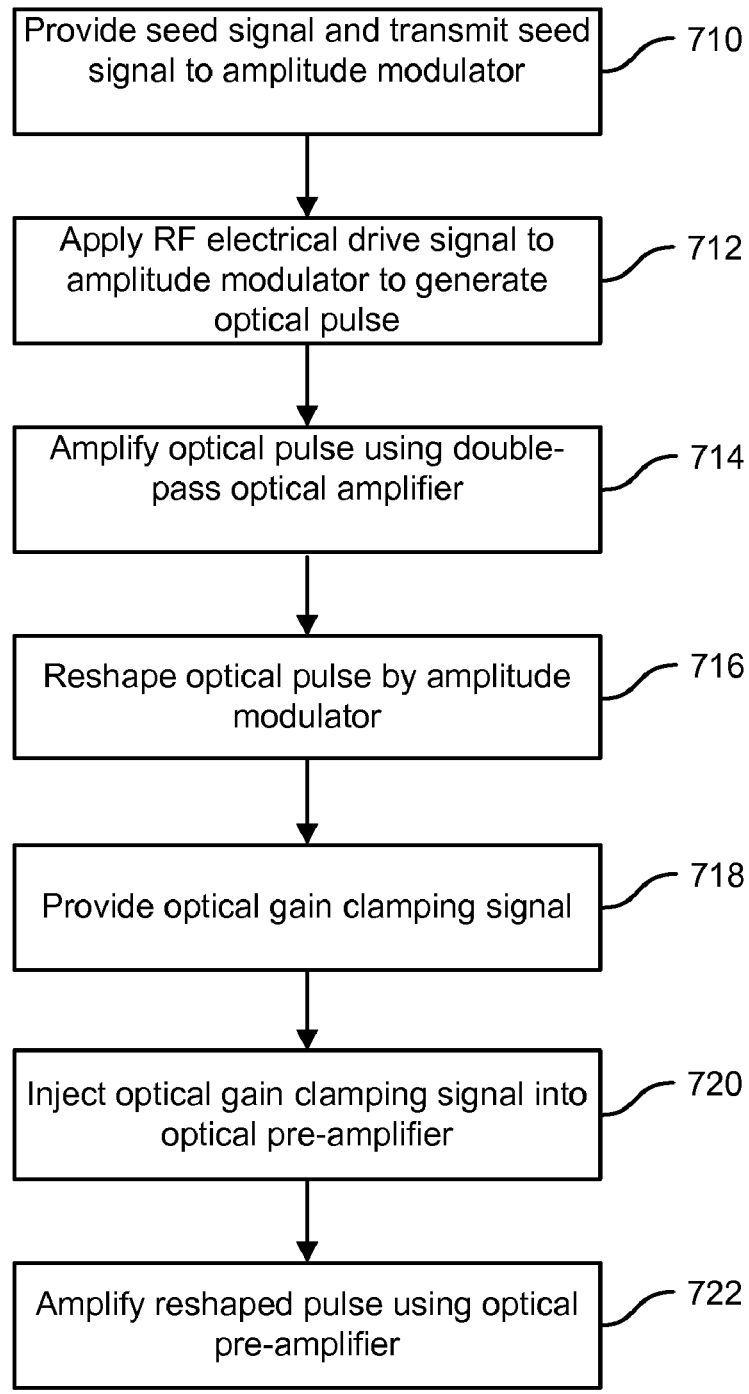
FIG. 7 is a flow chart illustrating steps for providing a gain clamping signal to minimize out-of-band gain at out-of-band wavelengths.

It should also be appreciated that the specific steps illustrated in FIG. 7 provide a particular method for providing gain clamping signal to reduce out-of-band gain at out-of-band wavelengths according to an embodiment of the present invention. The method starts with providing seed signal and transmitting the seed signal to an amplitude modulator at step 710. The next step 712 is to apply an RF electrical drive signal to the amplitude modulator to generate optical pulses. The optical pulses are amplified by using a double-pass optical amplifier at step 714 and reshaped by the amplitude modulator after being reflected by a reflective component 146 at step 716. The method also includes providing an optical gain clamping signal at step 718 and injecting the optical gain clamping signal into a pre-amplifier at step 720, as well as amplifying the reshaped optical pulses using the pre-amplifier at step 722 to reduce out-of-band gain at out-of-band wavelengths.

In embodiments including Ytterbium-doped optical fiber designed for operation, for example, at 1064 nm, double-clad Ytterbium-doped fiber with 10 µm core, the gain peak usually occurs at around 1032 nm. The gain clamping signal source wavelength would therefore preferably have a wavelength also around 1032 nm. The gain clamping signal source would preferably comprise a semiconductor diode laser with an optical power between 5 mW and 150 mW. The optical power however can be lower than 5 mW or higher than 150 mW. The gain clamping signal coupler is preferably a 1032 nm and 1064 nm WDM.

Figure 10:
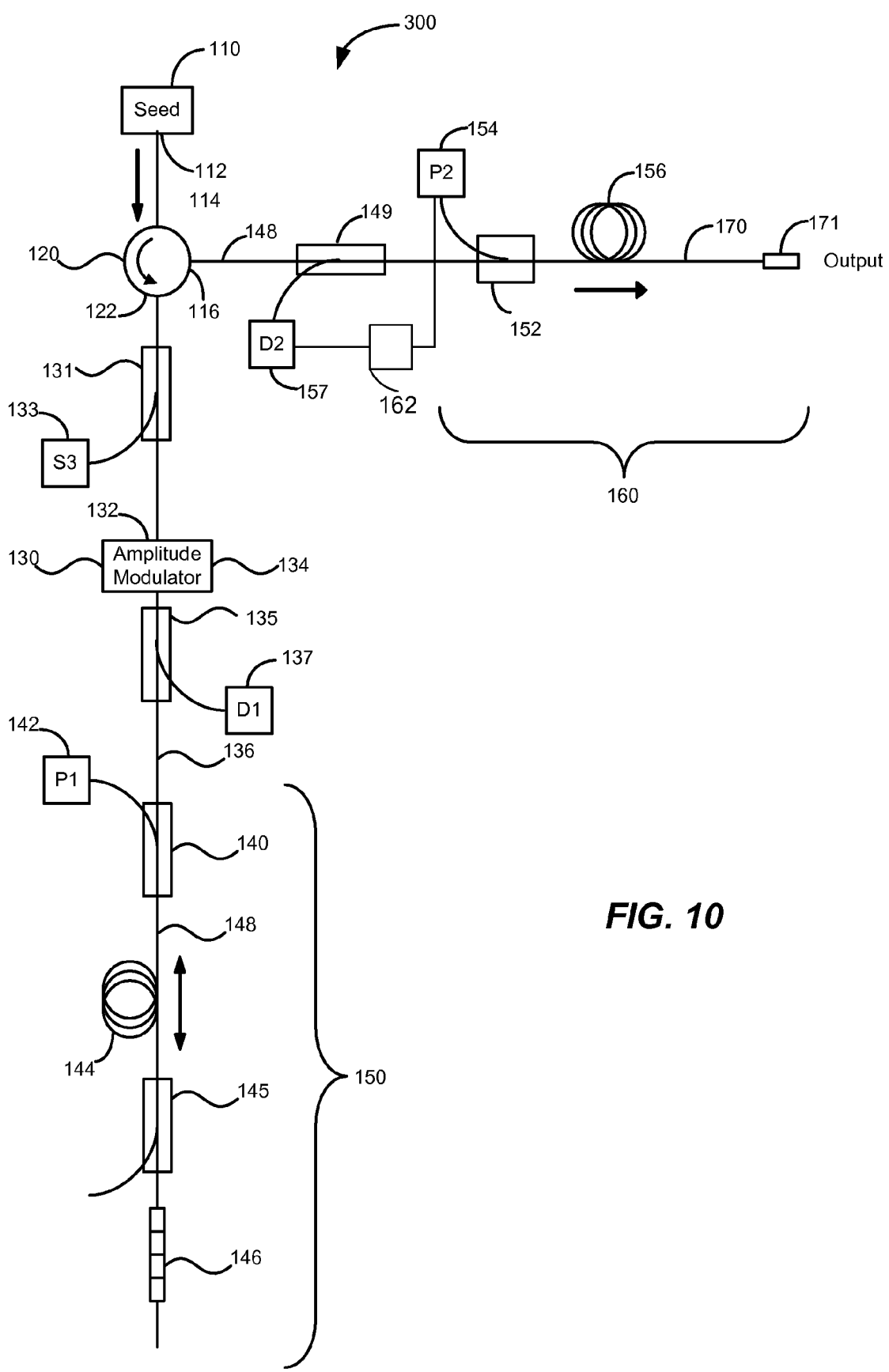
FIG. 10 is a simplified diagram illustrating a high power pulsed laser with tunable pulse characteristics using optical fiber amplifiers including a backward monitoring function and a controller for minimizing backward signals including ASE to an optical circulator from a pre-amplifier.

In embodiments of the present invention, it may be advantageous to monitor the ASE propagating backward in the optical pre-amplifier 160. Also, often a small fraction of the optical signal is reflected backward by the optical components, like the protective device 171, or splices in the pre-amplifier. Moreover, a reflection of the signal can occur outside of the optical pre-amplifier, for example, on a mirror, a lens, or a work piece. It may be advantageous to monitor also this backward reflected signal along with the backward ASE to prevent damage to the laser system. For example, this monitoring can be used to turn down pump power in the pre-amplifier 160. As shown in FIG. 10, a controller 162 is adapted to receive an input signal from the photo-detector 157 and to send an output signal to the pump 154 to reduce the pump power in the pre-amplifier 160.

Figure 3:
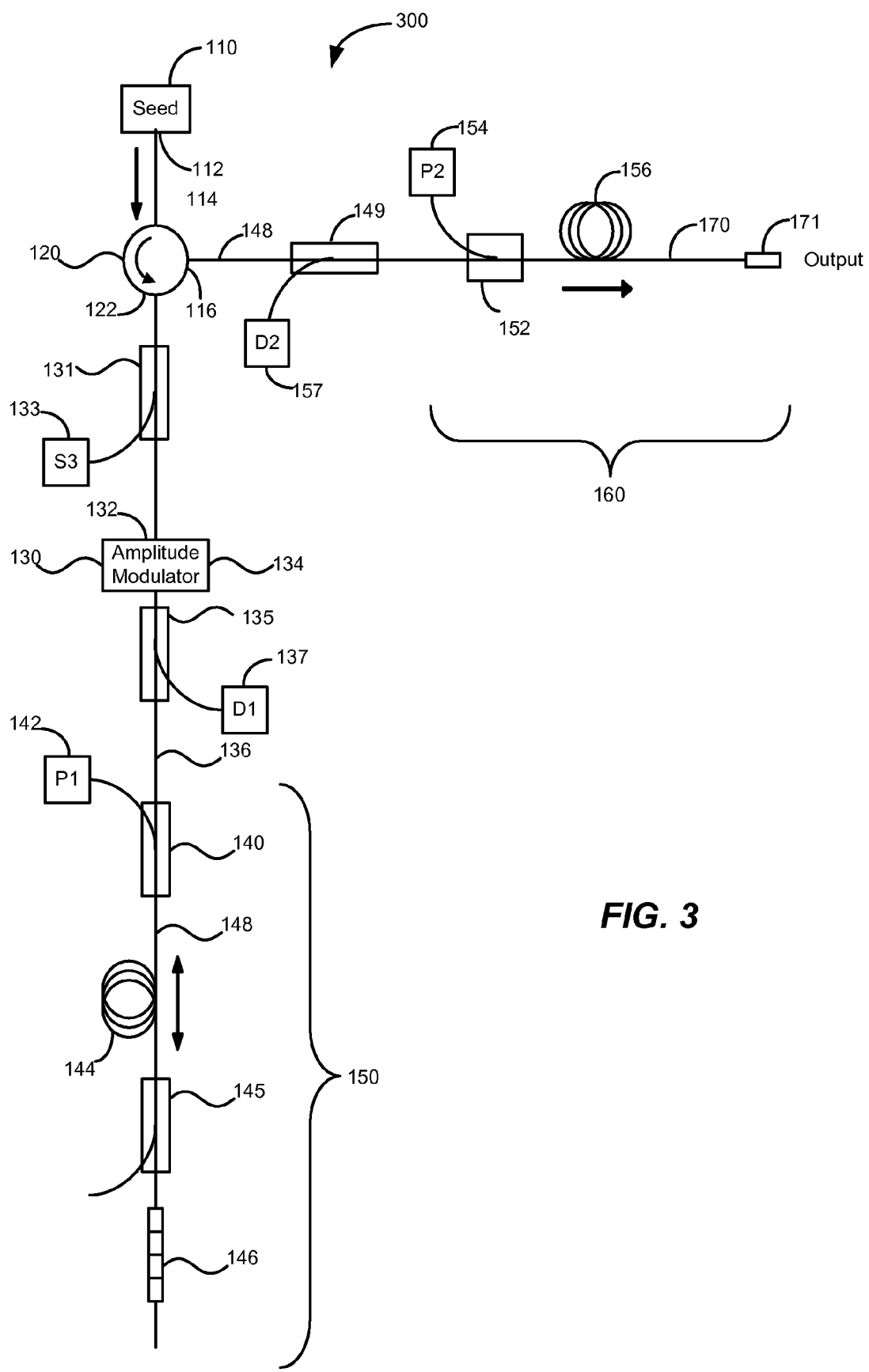
FIG. 3 is a simplified schematic illustration of a high power pulsed laser with tunable pulse characteristics using optical fiber amplifiers and including backward monitoring function according to an embodiment of the present invention.

FIG. 3 is a schematic illustration of a laser with tunable pulse characteristics 300 including a backward monitoring function. Like components are numbered similarly as in FIG. 1. In FIG. 3, the backward monitoring function includes a photo-detector 157 optically coupled to the backward ASE and signal of the optical pre-amplifier 160 through a tap coupler 149 or other suitable optical coupler. The gain clamping signal and optical signal exiting from port 3 of the circulator propagate with low loss through the tap coupler 149 before being injected into the optical pre-amplifier 160. Preferably, the tap coupler has a split ratio around 1%. However the split ratio can be lower or higher than 1%. For example, it can be 0.1%, 2%, 5%, 10%.

Figure 4:
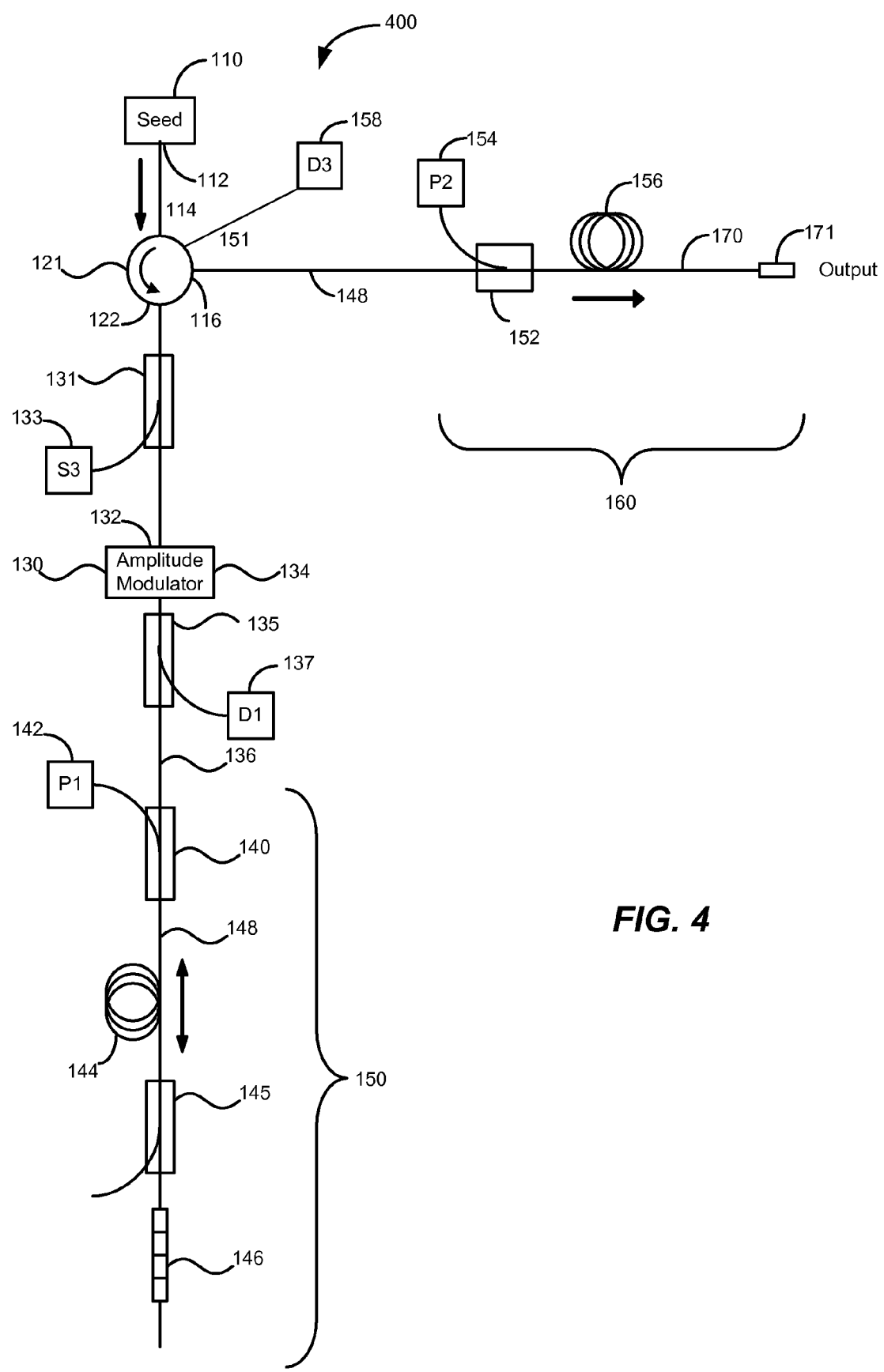
FIG. 4 is another simplified schematic illustration of a high power pulsed laser with tunable pulse characteristics using optical fiber amplifiers and including a backward monitoring function according to an embodiment of the present invention.

FIG. 4 is another schematic illustration of the backward monitoring function using a 4-port circulator as part of a pulsed laser with tunable characteristics 400. Again like components are numbered similarly as in FIG. 1 and FIG. 3. In FIG. 4, the previously used 3-port circulator is replaced by a 4-port circulator 121. Ports 1, 2, and 3 of the 4-port circulator are used similarly as with the 3-port circulator. The fourth port 151 is optically coupled to the photo-detector 158. Backward propagating ASE and signal enter the third port 116 and exit the fourth port 151 and impinge on photo-detector 158.

Although FIGS. 1, 3, and 4 illustrate the use of a single optical amplifier 160 coupled to the third port of the optical circulator 120 or 121, this is not required by the present invention. In alternative embodiments, multiple optical amplifiers are utilized downstream of the optical circulator 121 as appropriate to the particular applications. One of ordinary skill in the art would recognize many variations, modifications, and alternatives.

Figure 5:
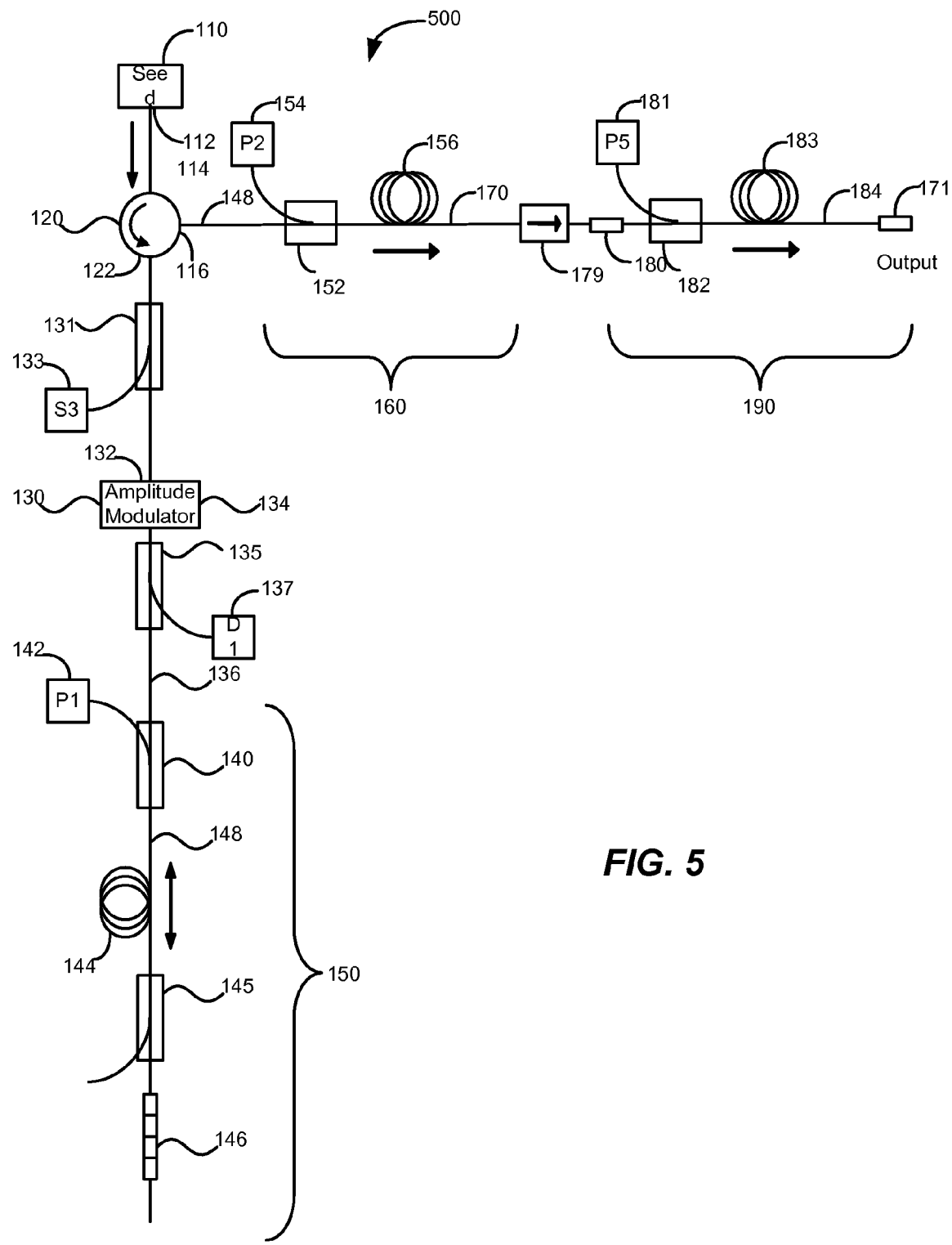
FIG. 5 is a simplified schematic illustration of a high power pulsed laser with tunable pulse characteristics using optical fiber amplifiers and including an optical power amplifier according to an embodiment of the present invention.

One such embodiment is illustrated in FIG. 5, which is a schematic of a pulsed laser with tunable characteristics 500 including a power amplifier to increase the output energy and power. Again similar components are numbered similarly as in FIGS. 1, 3, and 4. The tunable pulsed laser includes an optical power amplifier 190. The power amplifier 190 is preferably separated from the pre-amplifier 160 by an optical isolator 179, which prevents ASE from the power amplifier to be injected back into the pre-amplifier 160.

As discussed previously, embodiments of the present invention utilize a fiber amplifier as power amplifier 190, including a pump 181 that is coupled to a rare-earth-doped fiber loop 183 through an optical coupler 182. Generally, a semiconductor pump laser is used as pump 181, although pumping of optical amplifiers can be achieved by other means as will be evident to one of skill in the art. In a particular embodiment, the optical power amplifier 190 includes a 3 meter length of rare-earth doped double-clad fiber 183, having a core diameter of approximately 30 μm, and is doped with Ytterbium to a doping density of approximately $1 \times 10^{26}$ ions/m$^3$. The power amplifier 190 also includes a pump 181, which is preferably a fiber-coupled semiconductor laser diode bar having an output power of 20 W, 25 W, 30 W, or higher.

In other embodiments the optical coupler 182 can have multiple inputs each receiving optical power from a high power pump laser. For example, the optical coupler 182 can have two inputs each receiving 30 W of pump power for an aggregated pump power of 60 W. The aggregated pump power can be lower or higher than 60 W, for example it can be 30 W, 50 W, 75 W, or 100 W, or more. The power amplifier can also include a protective device 171 at the end as discussed previously. The optical power amplifier 190 can amplify optical pulses to 300 μJ, 500 μJ, or even higher, such as 1000 μJ of energy per pulse. Depending on the design and the application, the energy per pulse can even be higher than 1000 μJ. To go to even high powers, the fiber in the power amplifier can be a photonic crystal fiber.

Preferably, the optical fiber 183 used in the power amplifier 190 has a large core size to increase energy storage and to minimize nonlinear effect to generate higher pulse energies. For example, the core size can be about 30 μm with a numerical aperture (NA) of 0.07. For these larger core sizes and low NA, several optical modes can usually propagate. It is generally preferable for several applications to maintain the propagation of a single fundamental only in the fiber and to minimize optical power in the higher order modes. Embodiments of the present invention utilize several techniques to accomplish these goals.

For example, in one embodiment, coiling the fiber in diameters of about 8 to 10 cm is sufficient to induce high propagation loss and prevent the appearance of higher order modes in a 30 μm core fiber, and to maintain only the fundamental mode. A technique such as the coiling effectively render a 30 μm multimode core fiber to be a single mode fiber. Therefore, an amplifier built using such a method is effectively a single-mode optical amplifier. Preferably, pre-amplifier 160 and power amplifier 190 are single-mode amplifiers. To help excite only the fundamental mode of the power amplifier 190, a mode field adapter 180 can be inserted between the output of the pre-amplifier and the input of the power amplifier. The mode field adapter is used to adiabatically expand the fundamental mode from the pre-amplifier stage to the power amplifier stage.

For example, the pre-amplifier stage can use a fiber with a core diameter of about 10 μm, whereas the power amplifier stage can use a fiber with a core diameter of about 30 μm. Depending on the splicing process, this step in core diameter can induce an optical loss, which is too high for the application at hand. A mode field adapter would expand the optical mode from a 10 μm core to a 30 μm core, while minimizing optical loss. Returning to FIG. 5, the pre-amplifier 160 is built using a fiber 156 with a first core diameter. Preferably the optical isolator also uses the same first core diameter. The power amplifier 190 is built with a fiber 183 using a second core diameter. The mode field adapter 180 would therefore have a first end with a first core diameter and a second end with a second core diameter. Sometimes the optical coupler 182 can have a fiber with a core diameter intermediate between the first core and second core diameters. In this case, the mode field adapter 180 would preferably match the intermediate core diameter at his second end.

In an embodiment of the present invention, the gain-clamping signal is injected and amplified in the pre-amplifier 160, is transmitted partially through the optical isolator 179 and is injected into power amplifier 190. This injected signal also serves to gain clamp the power amplifier 190 and achieve the same benefits as for the pre-amplifier 160 as discussed previously. For example, about 10-50 mW of 1032 nm signal can be injected into optical pre-amplifier 160. In the absence of any operating pulsed signal at 1064 nm, the 1032 nm signal can be amplified to about 3 W with an optical pump 154 of 6 W. About 1 to 2 W of amplified 1032 nm signal can be transmitted through the optical isolator 179 and be injected into the power amplifier 190. The amplified 1032 nm signal would be re-amplified to about 25-30 W with an optical pump 181 of about 60 W.

Utilizing embodiments of the present invention, high power pulsed laser sources are provided that generate streams of optical pulses with independently adjustable pulse characteristics including pulse width, peak power and energy, pulse shape, and pulse repetition rate. Merely by way of example, a particular embodiment of the present invention delivers output pulses at the output 170 of second optical amplifier 160 of more than 5 µJ per pulse at a pulse width of 10 ns and at a repetition rate of 10 kHz, or even of more than 30 µJ per pulse at a pulse width of 30 ns and at a repetition rate of 100 kHz. Of course, other pulse characteristics are provided by alternative embodiments.

In the embodiments described above, a CW seed source is utilized and time-domain filtering to provide a laser pulse is performed using the amplitude modulator 130. However, this is not required by the present invention. In an alternative embodiment, the seed signal is modulated to provide a pulsed seed signal rather than CW seed signal. Providing a pulsed seed signal minimizes ASE build-up caused by seed leakage and enables the operating power range of the seed source to be increased. In this alternative embodiment, the pulsed seed signal may be of a pulse width equal to, or longer than the desired pulse width of overall pulsed laser source. Pulsing the seed can also increase the effective linewidth of the seed laser to reduce Stimulated Brillouin Scattering (SBS).

Other sequences of steps may also be performed according to alternative embodiments. For example, alternative embodiments of the present invention may perform the steps outlined above in a different order. Moreover, the individual steps illustrated in FIGS. 6 and 7 may include multiple substeps that may be performed in various sequences as appropriate to the individual step. Furthermore, additional steps may be added or removed depending on the particular applications. One of ordinary skill in the art would recognize many variations, modifications, and alternatives.

According to embodiments of the present invention, methods and systems are provided that result in the generation of sequences of optical pulses, which may not be equally separated in time. Moreover, the pulse widths and pulse energies are individually tailored in a predetermined manner from pulse to pulse. Furthermore, it will be recognized that although the above description discussed the generation of a single optical pulse, embodiments of the present invention provide for the generation of multiple pulses by repeating the single pulse a multiplicity of times. These multiple pulses may include an arbitrary train of optical pulse sequences.

While the present invention has been described with respect to particular embodiments and specific examples thereof, it should be understood that other embodiments may fall within the spirit and scope of the invention. The scope of the invention should, therefore, be determined with reference to the appended claims along with their full scope of equivalents.

What is claimed is:

1. A tunable pulsed laser source comprising:
a seed source adapted to generate a seed signal;
an optical circulator, wherein the optical circulator includes at least a first port coupled to the seed source, a second port, and a third port;
an amplitude modulator characterized by a first optical side and a second optical side, wherein:
the first optical side is coupled to the second port of the optical circulator, and
the amplitude modulator is adapted to receive a DC electrical signal from a digital-to-analog converter and a Radio Frequency (RF) electrical signal from a digital arbitrary waveform generator;
a first optical amplifier characterized by an input end and a reflective end, wherein the input end is optically coupled to the second side of the amplitude modulator;
a tap coupler optically coupled to the amplitude modulator, wherein the tap coupler is characterized by a pre-determined split ratio; and
a first photo-detector optically coupled to the tap coupler and adapted to receive a portion of the seed signal transmitted through the amplitude modulator and to generate an output signal,
wherein the DC electrical signal depends at least on the output signal.

2. The tunable pulsed laser source of claim 1 wherein the amplitude modulator is adapted to receive the DC electrical signal and the RF electrical signal using a single electrical port.

3. The tunable pulsed laser source of claim 1 wherein the amplitude modulator is adapted to receive the DC electrical signal using a first electrical port and the RF electrical signal using a second electrical port.

4. The tunable pulsed laser source of claim 1 further comprising a second optical amplifier optically coupled to the third port of the optical circulator.

5. The tunable pulsed laser source of claim 4 further comprising an end cap optically coupled to the second optical amplifier.

6. The tunable pulsed laser source of claim 4 further comprising a gain clamping source adapted to generate a gain clamping signal, wherein the gain clamping source is optically coupled to the second optical amplifier.

7. The tunable pulsed laser source of claim 6 wherein the gain clamping source is positioned between the optical circulator and the amplitude modulator.

8. The tunable pulsed laser source of claim 6 wherein the gain clamping source is positioned between the optical circulator and the second optical amplifier.

9. The tunable pulsed laser source of claim 6 further comprising a second photo-detector optically coupled to the third port of the optical circulator and the second optical amplifier.

10. The tunable pulsed laser source of claim 6 wherein the first optical amplifier and the second optical amplifier comprise a pump laser that is optically coupled to a rare-earth doped optical fiber.

11. The tunable pulsed laser source of claim 1 wherein the optical circulator further comprises a fourth port optically coupled to a second photo-detector.

12. A tunable pulsed laser source comprising:
a seed source adapted to generate a seed signal;

an optical circulator, wherein the optical circulator includes at least a first port coupled to the seed source, a second port, and a third port;

an amplitude modulator characterized by a first optical side and a second optical side, wherein the first optical side is coupled to the second port of the optical circulator;

a first optical amplifier characterized by an input end and a reflective end, wherein the input end is optically coupled to the second side of the amplitude modulator;

a second optical amplifier optically coupled to the third port of the optical circulator; and a gain clamping source optically coupled to the second optical amplifier, wherein the gain clamping source is positioned between the optical circulator and the amplitude modulator.

13. The tunable pulsed laser source of claim 12 wherein the first optical amplifier further comprises:

a tap coupler optically coupled to the amplitude modulator, wherein the tap coupler is characterized by a pre-determined split ratio; and a photo-detector optically coupled to the tap coupler, adapted to receive a portion of the seed signal transmitted through the amplitude modulator, and adapted to generate an output signal.

14. The tunable pulsed laser source of claim 13 wherein the amplitude modulator is adapted to receive a DC electrical signal from a digital-to-analog converter and a Radio Frequency (RF) electrical signal from a digital arbitrary waveform generator, wherein the DC electrical signal depends at least on the output signal.

15. The tunable pulsed laser source of claim 12 wherein the first optical amplifier includes an optical out-of-band loss element.

16. The tunable pulsed laser source of claim 15 wherein the out-of-band loss element is characterized by a transmission loss less than 3 dB at an operating wavelength and an transmission loss greater than 10 dB at out-of-band wavelengths.

17. The tunable pulsed laser source of claim 12 wherein the optical circulator further comprises a fourth port optically coupled to a photo-detector.

18. The tunable pulsed laser source of claim 12 wherein a photo-detector is optically coupled to the third port of the optical circulator and the second optical amplifier.

19. A tunable pulsed laser source comprising:

a seed source adapted to generate a seed signal;

an optical circulator including at least a first port coupled to the seed source, a second port, and a third port;

an amplitude modulator adapted to receive a DC electrical signal from a digital-to-analog converter and a Radio Frequency (RF) electrical signal from a digital arbitrary waveform generator, wherein the amplitude modulator has a first optical side and a second optical side, wherein the first optical side is coupled to the second port of the optical circulator;

a first optical amplifier having an input end and a reflective end, wherein the input end is optically coupled to the second optical side of the amplitude modulator;

a tap coupler optically coupled to the amplitude modulator, wherein the tap coupler is characterized by a pre-determined split ratio;

a photo-detector optically coupled to the tap coupler and adapted to receive a portion of the seed signal transmitted through the amplitude modulator defined by the pre-determined split ratio;

a second optical amplifier optically coupled to the third port of the optical circulator;

an optical isolator optically coupled to the second optical amplifier;

a third optical amplifier optically coupled to the optical isolator; and a gain clamping source optically coupled to the optical circulator.

20. The tunable pulsed laser source of claim 19 wherein the first optical amplifier, the second optical amplifier, and the third optical amplifier comprise a pump laser optically coupled to a rare-earth doped optical fiber.

21. The tunable pulsed laser source of claim 19 further comprising a mode field adaptor optically coupled to the optical isolator and the third optical amplifier.

22. The tunable pulsed laser source of claim 19 further comprising an end cap optically coupled to the third optical amplifier.

23. A method of providing a series of laser pulses, the method comprising:

providing a seed signal at a first port of an optical circulator;

transmitting the seed signal through an amplitude modulator coupled to a second port of the optical circulator;

detecting a portion of the seed signal transmitted through the amplitude modulator using a first photo-detector;

generating a DC electrical bias as a function of the detected portion;

applying the DC electrical bias to the amplitude modulator;

reducing an amount of the seed signal transmitted through the amplitude modulator;

applying a first shaped RF electrical drive signal to the amplitude modulator to generate a shaped optical pulse;

amplifying the shaped optical pulse in a first optical amplifier to provide an amplified shaped optical pulse;

applying a second shaped RF electrical drive signal to the amplitude modulator to reshape the amplified shaped optical pulse; and amplifying the reshaped optical pulse in a second optical amplifier to provide an amplified reshaped optical pulse.

24. The method of claim 23 further comprising:

providing an optical gain clamping signal; and injecting the optical gain clamping signal into a second optical amplifier coupled to a third port of the optical circulator.

25. The method of claim 24 wherein an amplified spontaneous emission (ASE) signal or a signal reflected from the second optical amplifier is reduced in response to injecting the optical gain clamping signal into the second optical amplifier.

26. The method of claim 23 further comprising:

detecting an ASE signal propagating backwards from the second amplifier; and adjusting a pump power for the second optical amplifier in response to the detected ASE signal.

27. The method of claim 23 further comprising:

applying the shaped optical pulse to an optical out-of-band loss element optically coupled to the first optical amplifier; and increasing a transmission loss at out-of-band wavelengths.

28. The method of claim 27 further comprising reducing a transmission loss at an operating wavelength.

29. A method of providing a series of laser pulses, the method comprising:

providing a seed signal at a first port of an optical circulator;

transmitting the seed signal through an amplitude modulator coupled to a second port of the optical circulator;

applying a first shaped RF electrical drive signal to the amplitude modulator to generate a shaped optical pulse;

amplifying the shaped optical pulse in a first optical amplifier to provide an amplified shaped optical pulse;

applying a second shaped RF electrical drive signal to the amplitude modulator to reshape the amplified shaped optical pulse;

providing an optical gain clamping signal;

injecting the optical gain clamping signal into a second optical amplifier optically coupled to a third port of the optical circulator; and amplifying the reshaped optical pulse using the second optical amplifier to provide an amplified reshaped optical pulse.

30. The method of claim 29 further comprising applying a DC electrical bias to the amplitude modulator, wherein the DC electrical bias depends at on an output signal generated by using a photo-detector to detect a portion of the seed signal transmitted through the amplitude modulator.

31. The method of claim 29 wherein injecting the optical gain clamping signal into the second optical amplifier comprises use of a gain clamping coupler positioned between the optical circulator and the amplitude modulator.

32. The method of claim 29 wherein injecting the optical gain clamping signal into the second optical amplifier comprises use of a gain clamping coupler positioned between the third port of the optical circulator and the second optical amplifier.

33. The method of claim 29 wherein a wavelength of the gain clamping signal is within a gain bandwidth of the second amplifier, but is different from an operating wavelength of the seed source.

34. The method of claim 29 further comprising:

detecting an ASE signal propagating backwards from the second amplifier; and adjusting a pump power for the second optical amplifier in response to the detected ASE signal.

35. The method of claim 29 further comprising:

applying the shaped optical pulse to an optical out-of-band loss element optically coupled to the first optical amplifier; and increasing a transmission loss at out-of-band wavelengths.

* * * * *